US012770007B2

(12) United States Patent
Jiang et al.

(10) Patent No.: US 12,770,007 B2
(45) Date of Patent: Oct. 20, 2026

(54) METHOD AND APPARATUS FOR COMPRESSING AND ACCELERATING MULTI-RATE NEURAL IMAGE COMPRESSION MODEL BY MICRO-STRUCTURED NESTED MASKS AND WEIGHT UNIFICATION

(71) Applicant: TENCENT AMERICA LLC, Palo Alto, CA (US)

(72) Inventors: Wei Jiang, Sunnyvale, CA (US); Wei Wang, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 1289 days.

(21) Appl. No.: 17/317,055

(22) Filed: May 11, 2021

(65) Prior Publication Data

US 2022/0051101 A1 Feb. 17, 2022

Related U.S. Application Data

(60) Provisional application No. 63/065,598, filed on Aug. 14, 2020.

(51) Int. Cl.
*G06N 3/082* (2023.01)
*G06F 18/214* (2023.01)
*G06N 3/045* (2023.01)

(52) U.S. Cl.
CPC ........... *G06N 3/082* (2013.01); *G06F 18/214* (2023.01); *G06N 3/045* (2023.01)

(58) Field of Classification Search
CPC ....... G06N 3/082; G06N 3/045; G06F 18/214
See application file for complete search history.

(56) References Cited

U.S. PATENT DOCUMENTS 10,623,775 B1 * 4/2020 Theis ..................... G06N 3/045
2006/0126732 A1 * 6/2006 Pian ..................... H04N 19/186 375/240.03
2019/0124346 A1 4/2019 Ren et al.
(Continued)

FOREIGN PATENT DOCUMENTS

CN 114631119 A 6/2022
CN 111008640 B * 3/2024 ........... G06F 18/214
WO 2022/005594 A1 1/2022

OTHER PUBLICATIONS

Liu et al., Non-local Attention Optimized Deep Image Compression, Apr. 22, 2019, Nanjing University and New York University, pp. 1-4 (Year: 2019).*
(Continued)

*Primary Examiner* — David Yi
*Assistant Examiner* — Syed Rayhan Ahmed
(74) *Attorney, Agent, or Firm* — Sughrue Mion, PLLC

(57) ABSTRACT

A method of multi-rate neural image compression is performed by at least one processor and includes selecting encoding masks, based on a first hyperparameter, and performing a convolution of a first plurality of weights of a first neural network and the selected encoding masks to obtain first masked weights. The method further includes encoding an input image to obtain an encoded representation, using the first masked weights, and encoding the obtained encoded representation to obtain a compressed representation.

20 Claims, 9 Drawing Sheets

(56) References Cited

U.S. PATENT DOCUMENTS

| | | | | |
|---|---|---|---|---|
| 2020/0160565 | A1* | 5/2020 | Ma | H04N 19/60 |
| 2021/0125071 | A1* | 4/2021 | Ren | G06N 3/04 |
| 2021/0397965 | A1* | 12/2021 | Zhang | G06N 3/082 |
| 2022/0036189 | A1* | 2/2022 | Courville | G06N 3/082 |

OTHER PUBLICATIONS

Kim et al., Efficient Deep Learning-Based Lossy Image Compression via Asymmetric Autoencoder and Pruning, 2020, School of Integrated Technology, Yonsei University, Korea and Naver Webtoon Corp., Korea, pp. 1-3 (Year: 2020).*

Communication dated Nov. 30, 2023, issued in Chinese Application No. 202180005715.4.

Extended European Search Report dated Dec. 12, 2022 in European Application No. 21856383.1.

Wei Jiang et al., "Structured Weight Unification and Encoding for Neural Compression and Acceleration", IEEE/CVF Conference on Computer Vision and Pattern Recognition Workshops (CVPRW), 2020, pp. 3068-3076 (9 pages total).

David Alexandre et al., "An Autoencoder-based Learned Image Compressor: Description of Challenge Proposal by NCTU", arXiv:1902.07385v1, 2019 (4 pages total).

International Search Report issued Sep. 17, 2021 in International Application No. PCT/US2021/035462.

Written Opinion of the International Searching Authority issued Sep. 17, 2021 in International Application No. PCT/US2021/035462.

Chen et al., "Neural Image Compression via Non-Local Attention Optimization and Improved Context Modeling", Cornell University Library/ Electrical Engineering and Systems Science/Image and Video Processing, Oct. 11, 2019, https://arxiv.org/abs/1910.06244 (13 pages total).

* cited by examiner

METHOD AND APPARATUS FOR COMPRESSING AND ACCELERATING MULTI-RATE NEURAL IMAGE COMPRESSION MODEL BY MICRO-STRUCTURED NESTED MASKS AND WEIGHT UNIFICATION

CROSS-REFERENCE TO RELATED APPLICATION

This application is based on and claims priority to U.S. Provisional Patent Application No. 63/065,598, filed on Aug. 14, 2020, the disclosure of which is incorporated by reference herein in its entirety.

BACKGROUND

Standard groups and companies have been actively searching for potential needs for standardization of future video coding technology. These standard groups and companies have focused on artificial intelligence (AI)-based end-to-end neural image compression (NIC) using deep neural networks (DNNs). The success of this approach has brought more and more industrial interest in advanced neural image and video compression methodologies.

Flexible bitrate control remains a challenging issue for previous NIC methods. Conventionally, it may include training multiple model instances targeting each desired trade-off between a rate and a distortion (a quality of compressed images) individually. All these multiple model instances may need to be stored and deployed on a decoder side to reconstruct images from different bitrates. This may be prohibitively expensive for many applications with limited storage and computing resources.

SUMMARY

According to embodiments, a method of multi-rate neural image compression is performed by at least one processor and includes selecting encoding masks, based on a first hyperparameter, and performing a convolution of a first plurality of weights of a first neural network and the selected encoding masks to obtain first masked weights. The method further includes encoding an input image to obtain an encoded representation, using the first masked weights, and encoding the obtained encoded representation to obtain a compressed representation.

According to embodiments, an apparatus for multi-rate neural image compression includes at least one memory configured to store program code, and at least one processor configured to read the program code and operate as instructed by the program code, the program code including first selecting code configured to cause the at least one processor to select encoding masks, based on a hyperparameter, and first performing code configured to cause the at least one processor to perform a convolution of a first plurality of weights of a first neural network and the selected encoding masks to obtain first masked weights. The program code includes first encoding code configured to cause the at least one processor to encode an input image to obtain an encoded representation, using the first masked weights, and second encoding code configured to cause the at least one processor to encode the obtained encoded representation to obtain a compressed representation.

According to embodiments, a non-transitory computer-readable medium storing instructions that, when executed by at least one processor for multi-rate neural image compression, cause the at least one processor to select encoding masks, based on a hyperparameter, perform a convolution of a first plurality of weights of a first neural network and the selected encoding masks to obtain first masked weights, encode an input image to obtain an encoded representation, using the first masked weights, and encode the obtained encoded representation to obtain a compressed representation.

DETAILED DESCRIPTION

The disclosure describes a method and an apparatus for generating a highly efficient multi-rate NIC model in terms of both storage and computation. Only one NIC model instance is used to achieve image compression at multiple bitrates with the guidance from a set of nested binary masks targeting different bitrates. Also, weight coefficients of the model instance are micro-structurally unified to reduce inference computation.

Figure 1:
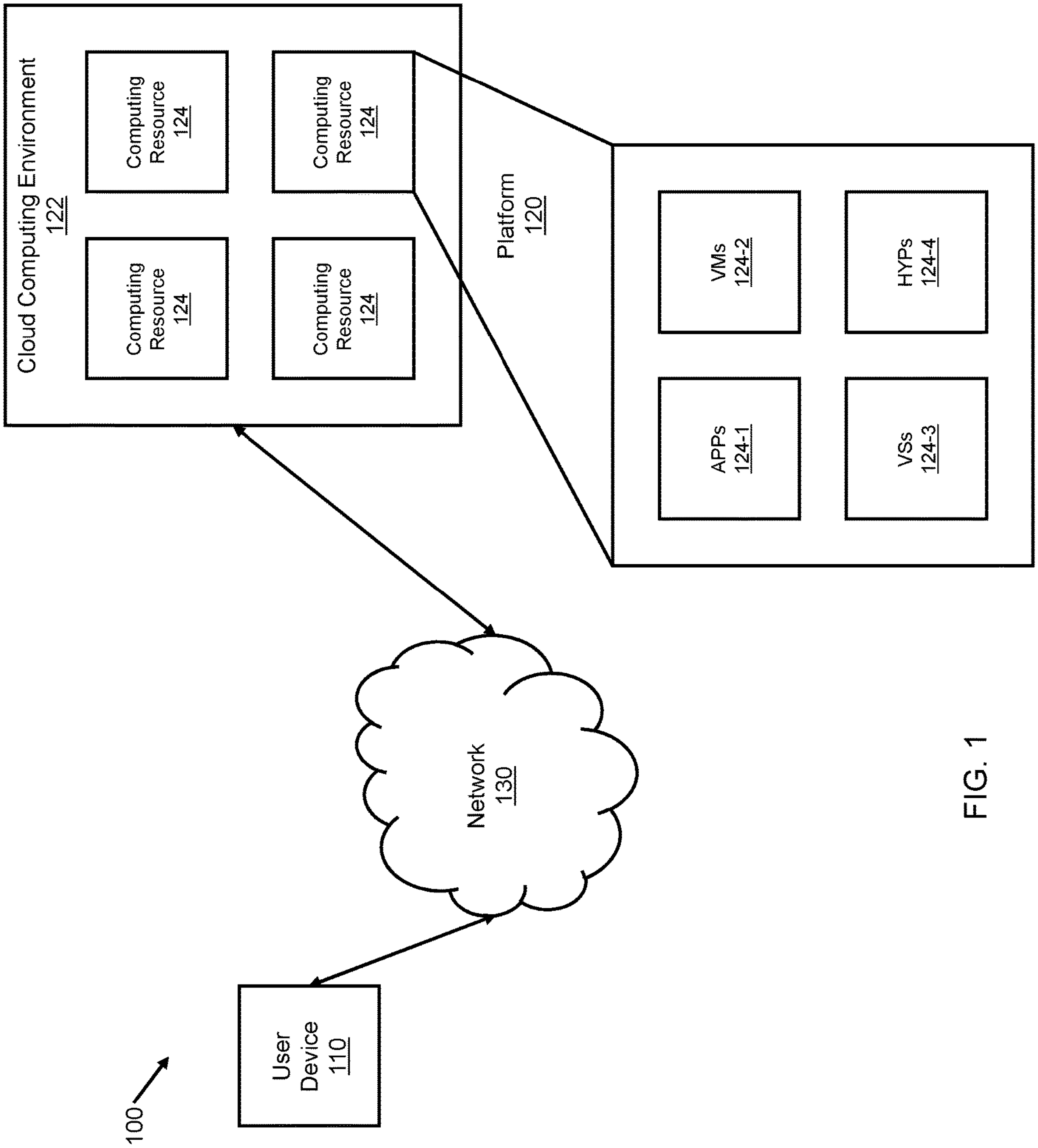
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
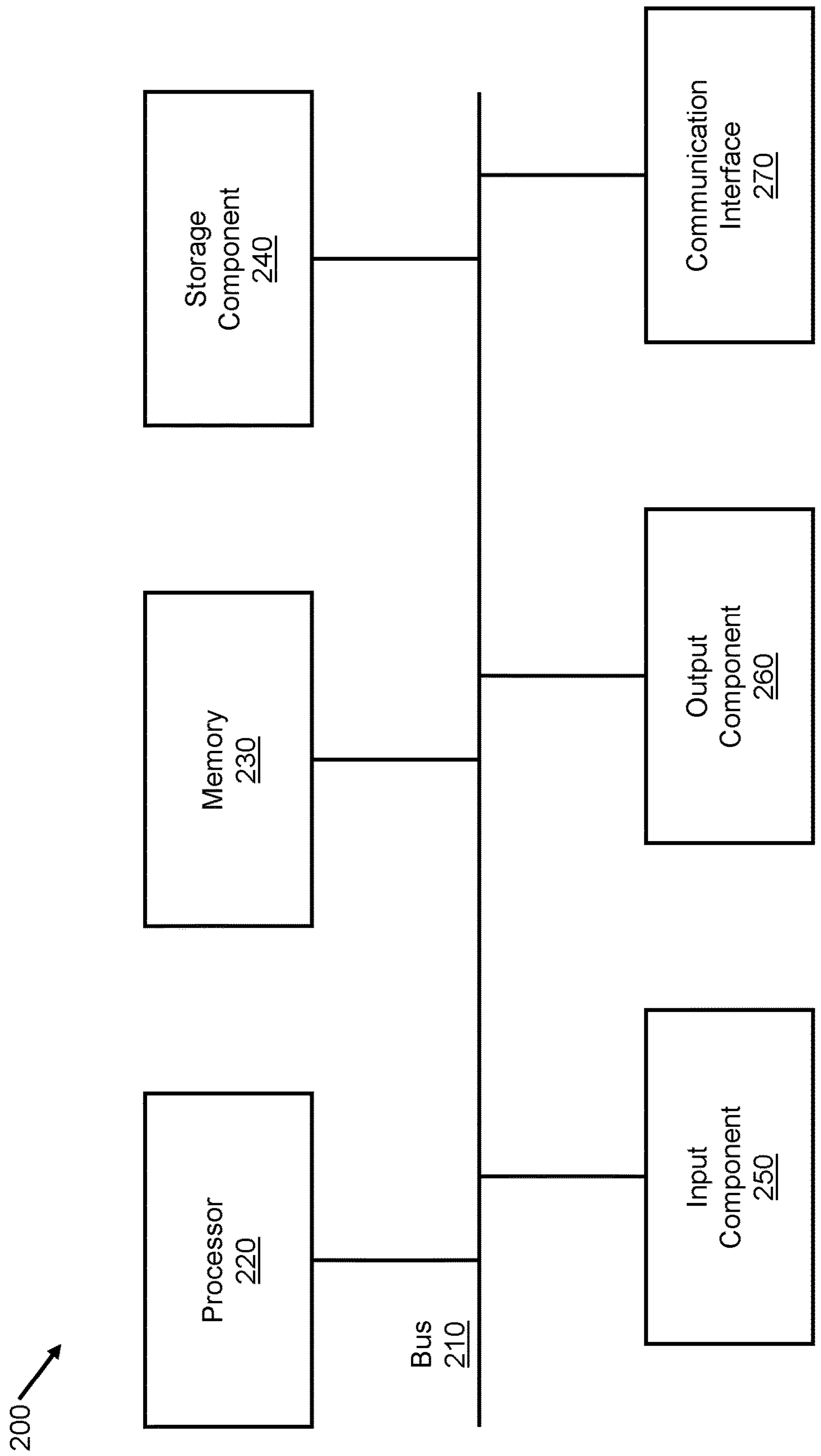
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A method and an apparatus for multi-rate neural image compression by micro-structured nested masks and weight unification will now be described in detail.

This disclosure proposes a framework of learning and deploying only one NIC model instance that supports multi-rate image compression. In particular, a set of nested binary masks is learned, one for each targeted bitrate, to guide the decoder in the reconstruction stage to recover images from different bitrates.

Figure 3:
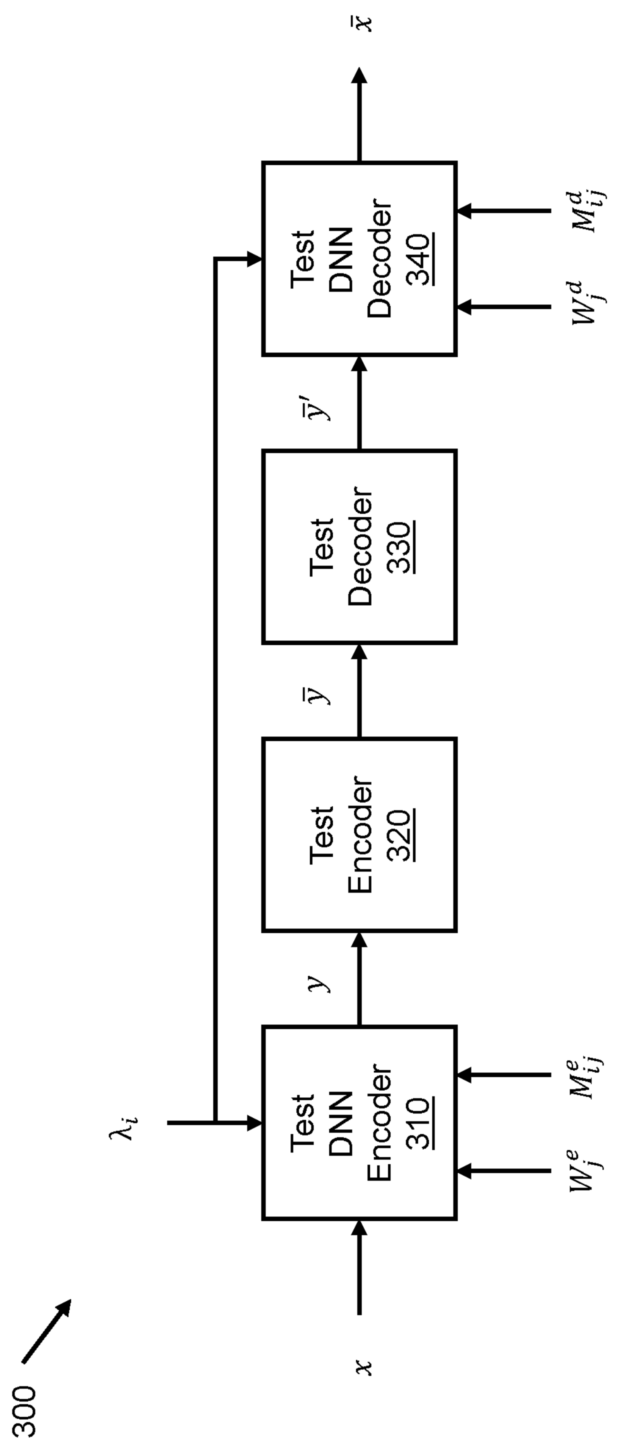
FIG. 3 is a block diagram of a test apparatus for multi-rate neural image compression by micro-structured nested masks and weight unification, during a test stage, according to embodiments.

FIG. 3 is a block diagram of a test apparatus 300 for multi-rate neural image compression by micro-structured nested masks and weight unification, during a test stage, according to embodiments.

As shown in FIG. 3, the test apparatus 300 includes a test DNN encoder 310, a test encoder 320, a test decoder 330 and a test DNN decoder 340.

Given an input image x of size (h,w,c), where h, w, c are the height, width, and number of channels, respectively, the target of the test stage of an NIC workflow can be described as follows. A compressed representation $\bar{y}$ that is compact for storage and transmission is computed. Then, based on the compressed representation $\bar{y}$, an output image $\bar{x}$ is reconstructed, and the reconstructed output image $\bar{x}$ may be similar to the original input image x. In the embodiments, the process of computing the compressed representation $\bar{y}$ is separated into two parts: a DNN encoding process that uses the test DNN encoder 310 to compute a DNN-encoded representation y, and then an encoding process in which the representation y is encoded through the test encoder 320 (performing quantization and entropy coding) to generate the compressed representation $\bar{y}$. Accordingly, the decoding process is separated into two parts: a decoding process in which the compressed representation $\bar{y}$ is decoded (through decoding and dequantization) by the test decoder 330 to generate a recovered representation $\bar{y}'$, and then an DNN decoding process in which the recovered representation $\bar{y}'$ is used by the test DNN decoder 340 to reconstruct the output image $\bar{x}$. In this disclosure, there is not any restriction on the network structures of the test DNN encoder 310 used for DNN encoding or the test DNN decoder 340 used for DNN decoding. There is not any restriction on the methods (the quantization methods and the entropy coding methods) used for encoding or decoding either.

To learn the NIC model, two competing desires are dealt with: better reconstruction quality versus less bits consumption. A loss function D (x, $\bar{x}$) is used to measure the reconstruction error, which is called the distortion loss, such as the peak signal-to-noise ratio (PSNR) and/or structural similarity index measure (SSIM) between the input image x and the output image $\bar{x}$. A rate loss R($\bar{y}$) is computed to measure the bit consumption of the compressed representation $\bar{y}$. Therefore, a trade-off hyperparameter λ is used to optimize a joint rate-distortion (R-D) loss:

$$L(x, \bar{x}, \bar{y}) = \lambda D(x, \bar{x}) + R(\bar{y}) \tag{1}$$

Training with a large hyperparameter λ results in compression models with smaller distortion but more bit consumption, and vice versa. Traditionally, for each pre-defined tradeoff hyperparameter λ, an NIC model instance will be trained, which will not work well for other values of the hyperparameter λ. Therefore, to achieve multiple bitrates of the compressed stream, traditional methods may require training and storing multiple model instances, one for each target value of the hyperparameter λ.

Multi-Rate NIC with Masks

One single trained model instance of the NIC network is used, and a set of nested binary masks is used to guide the NIC model instance to generate a different compressed representation as well as the corresponding reconstructed image, each mask targeting a different value of a hyperparameter λ. Specifically, let $\{W^e_j\}$ and $\{W^d_j\}$ denote a set of weight coefficients of the encoder and decoder part of the NIC model instance, respectively, where $W^e_j$ and $W^d_j$ are the weight coefficients of the j-th layer of the DNN encoder and decoder, respectively. Let $\lambda_1, \ldots, \lambda_N$ denote N hyperparameters, and let $\overline{y}_i$ and $\overline{x}_i$ denote the compressed representation and reconstructed image corresponding to a hyperparameter $\lambda_i$. Let $M^e_{ij}$ and $M^d_{ij}$ denote binary masks for the j-th layer of the DNN encoder and decoder, respectively, corresponding to the hyperparameter $\lambda_i$. Weights $W^e_j$ correspond to a 5-dimensional (5D) tensor with size $(c_1,k_1,k_2,k_3,c_2)$. The input of the layer is a 4-dimensional (4D) tensor A of size $(h_1,w_1,d_1,c_1)$, and the output of the layer is a 4D tensor B of size $(h_2,w_2,d_2,c_2)$. The sizes $c_1$, $k_1$, $k_2$, $k_3$, $c_2$, $h_1$, $w_1$, $d_1$, $h_2$, $w_2$, $d_2$ are integer numbers, each greater or equal to 1. When any of the sizes $c_1$, $k_1$, $k_2$, $k_3$, $c_2$, $h_1$, $w_1$, $d_1$, $h_2$, $w_2$, $d_2$ takes number 1, the corresponding tensor reduces to a lower dimension. Each item in each tensor is a floating number. The parameters $h_1$, $w_1$ and $d_1$ ($h_2$, $w_2$ and $d_2$) are the height, weight and depth of the input tensor A (output tensor B). The parameter $c_1$ ($c_2$) is the number of input (output) channels. The parameters $k_1$, $k_2$ and $k_3$ are the size of the convolution kernel corresponding to the height, weight and depth axes, respectively. The output B is computed through the convolution operation ⊙ based on the input A, the mask $$M^e_{ij}$$

and the weights $$W^e_j.$$

That is, the output B is computed as the input A convolving with masked weights $$W^{e\prime}_{ij} = W^e_j \cdot M^e_{ij},$$

where · is element-wise multiplication. Similarly, for weights $$W^d_j,$$

its output is computed through the convolution of the input A with masked weights $$W^{d\prime}_{ij} = W^d_j \cdot M^d_{ij}.$$

FIG. 3 gives an overall workflow of a test stage. Specifically, the test DNN encoder 310 has only one model instance with weights $$\{W^e_j\},$$

and the test DNN decoder 340 has only one model instance with weights $$\{W^d_j\}.$$

Given an input image x and a target hyperparameter $\lambda_i$, the test DNN encoder 310 selects a set of encoding masks $$\{M^e_{ij}\}$$

to compute masked weights $$\{W^{e\prime}_{ij}\},$$

which are used to compute a DNN-encoded representation y. Then, the test encoder 320 computes a compressed representation $\overline{y}$ in an encoding process. Based on the compressed representation $\overline{y}$, the test decoder 330 computes a recovered representation $\overline{y}'$ through a decoding process. Using the hyperparameter $\lambda_i$, the test DNN decoder 340 selects a set of decoding masks $$\{M^d_{ij}\}$$

to compute masked weights $$\{W^{d\prime}_{ij}\},$$

which are used to compute a reconstructed image $\overline{x}$ based on the recovered representation $\overline{y}'$.

NIC with Micro-Structured Weight Unification

The shape of weights $$W^e_j \text{ or } W^d_j$$

(so as the mask $$M^e_{ij} \text{ or } M^d_{ij})$$

can be changed, corresponding to the convolution of a reshaped input with the reshaped weights $$W_j^e \text{ or } W_j^d,$$

to obtain the same output. The embodiments may include two configurations. First, the 5D weight tensor is reshaped into a 3D tensor of size $$(c_1', c_2', k),$$

where $$c_1' \times c_2' \times k = c_1 \times c_2 \times k_1 \times k_2 \times k_3$$

For example, a configuration is $$c_1' = c_1, c_2' = c_2, k = k_1 \times k_2 \times k_3.$$

Second, the 5D weight tensor is reshaped into a 2D matrix of size $$(c_1', c_2'),$$

where $$c_1' \times c_2' = c_1 \times c_2 \times k_1 \times k_2 \times k_3.$$

For example, configurations are $$c_1' = c_1, c_2' = c_2 \times k_1 \times k_2 \times k_3, \text{ or } c_2' = c_2, c_1' = c_1 \times k_1 \times k_2 \times k_3.$$

The desired micro-structure of the masks is designed to align with the underlying general matrix multiply (GEMM) matrix multiplication process of how the convolution operation is implemented so that the inference computation of using the masked weight coefficients can be accelerated. In the embodiments, block-wise micro-structures are used for the masks (so as the masked weight coefficients) of each layer in the 3D reshaped weight tensor or the 2D reshaped weight matrix. Specifically, for the case of reshaped 3D weight tensor, it is partitioned into blocks of size $(g_i, g_o, g_k)$, and for the case of reshaped 2D weight matrix, it is partitioned into blocks of size $(g_i, g_o)$. All items in a block of a mask will have the same binary value 1 (as not pruned) or 0 (as pruned). That is, weight coefficients are masked out in the block-wise micro-structured fashion.

For the remaining weight coefficients in $$W_j^e \text{ and } W_j^d$$

(whose corresponding elements in masks $$M_{ij}^e \text{ and } M_{ij}^d$$

take value 1), they are further unified in a micro-structured fashion. Again, for the case of reshaped 3D weight tensor, it is partitioned into blocks of size $(p_i, p_o, p_k)$, and for the case of reshaped 2D weight matrix, it is partitioned into blocks of size $(p_i, p_o)$. The unification operation happens within a block. For instance, in the embodiments, when weights are unified within a block $B_u$, weights within the block are set to have the same absolute value (the mean of the absolute of the original weights in the block) and keep their original signs. A unification loss $L_u(B_u)$ can be computed by measuring the error caused by this unification operation. In the embodiments, the standard deviation of the absolute of the original weights in the block is used to compute $L_u(B_u)$. The main advantage of using micro-structurally unified weights is to save the number of multiplications in inference computation. The unification blocks $B_u$ can have different shapes than the pruning blocks.

The goal of the training stage is to learn the set of micro-structurally unified encoding weight coefficients $$\{W_j^e(\lambda_i)\}$$

with the corresponding set of micro-structured encoding masks $$\{M_{ij}^e\},$$

and the set of micro-structurally unified decoding weight coefficients $$\{W_j^d(\lambda_i)\}$$

with the corresponding set of micro-structured decoding masks $$\{M_{ij}^d\},$$

targeting each hyperparameter $\lambda_i$. Two progressive multi-stage training frameworks may achieve this goal, which are described in FIGS. 4A and 4B, respectively.

Figure 4A:
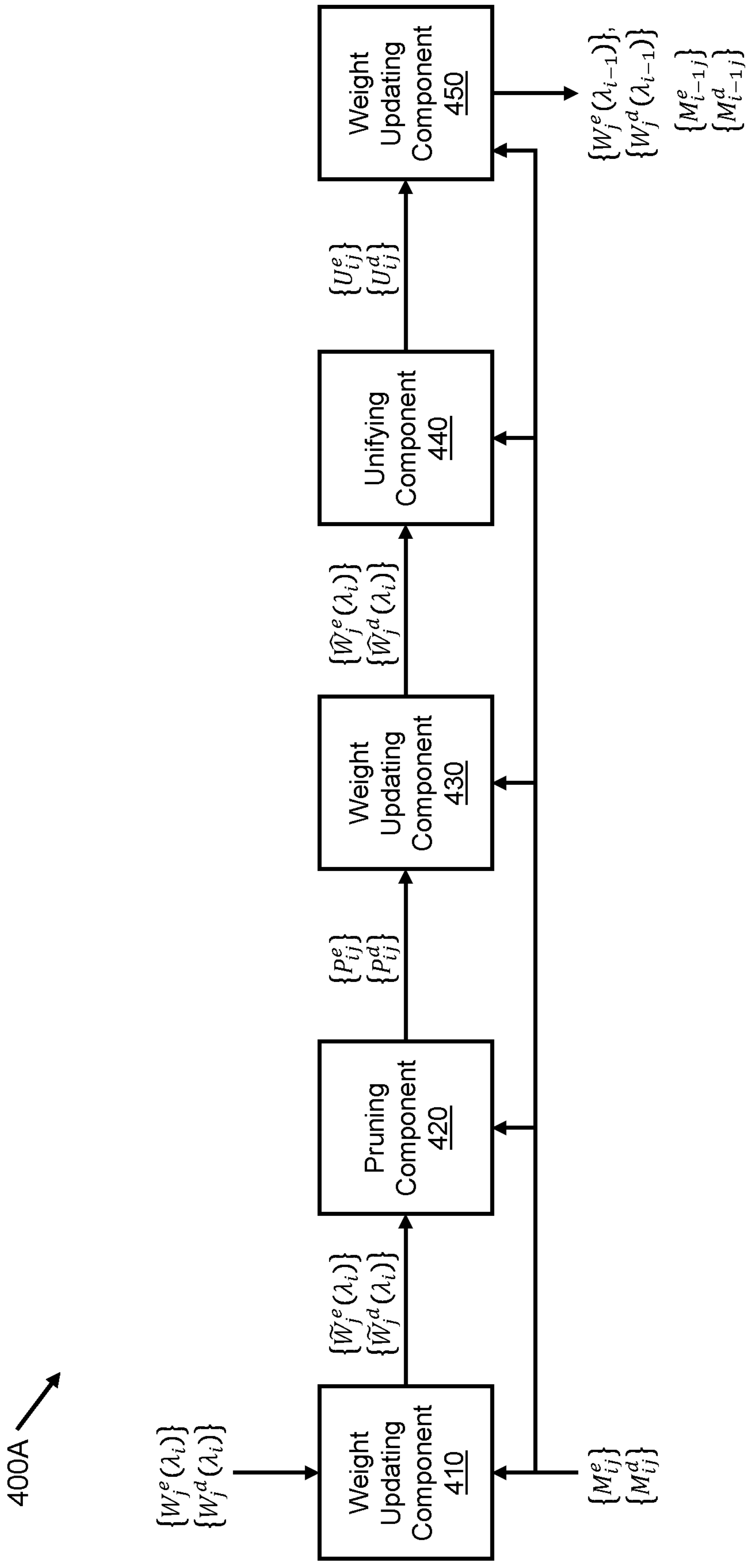
FIG. 4A is a block diagram of a training apparatus for multi-rate neural image compression by micro-structured nested masks and weight unification, during a training stage, according to embodiments.

FIG. 4A is a block diagram of a training apparatus 400A for multi-rate neural image compression by micro-structured nested masks and weight unification, during a training stage, according to embodiments.

As shown in FIG. 4A, the training apparatus 400A includes a weight updating component 410, a pruning component 420, a weight updating component 430, a unifying component 440 and a weight updating component 450.

Without loss of generality, it is assumed assume that hyperparameters $\lambda_1, \ldots, \lambda_i$ are ranked in descending order, corresponding to masks that generate compressed representations with increasing distortion (decreasing quality) and decreasing rate loss (increasing bitrates). The following describes the details of the training framework described in FIG. 4A.

Assume that the current target is to train the masks targeting hyperparameters $\lambda_{i-1}$, the current model instance have weights $$\{W_j^e(\lambda_i)\}, \{W_j^d(\lambda_i)\},$$

and there are masks $$\{M_{ij}^e\}, \{M_{ij}^d\}.$$

Now the goal is to obtain the masks $$\{M_{i-1j}^e\} \text{ and } \{M_{i-1j}^d\},$$

as well as computing the set of weights $$\{W_j^e(\lambda_{i-1})\} \text{ and } \{W_j^d(\lambda_{i-1})\}.$$

In the first step, the weight updating component 410 fixes the weight coefficients in $$\{W_j^e(\lambda_i)\} \text{ and } \{W_j^d(\lambda_i)\}$$

that are masked by $$\{M_{ij}^e\} \text{ and } \{M_{ij}^d\},$$

respectively. For example, if an entry in $$M_{ij}^e$$

the corresponding weight in $$W_j^e(\lambda_i)$$

will be fixed. Then, the weight updating component 410 updates the remaining unmasked weight coefficients in $$\{W_j^e(\lambda_i)\} \text{ and } \{W_j^d(\lambda_i)\}$$

through regular back-propagation using R-D loss of Equation (1) targeting the first hyperparameter $\lambda_1$ (the minimum distortion), into weight coefficients $$\{\tilde{W}_j^e(\lambda_i)\} \text{ and } \left\{\tilde{W}_j^d(\lambda_i)\right\},$$

in a weight update process. Multiple epoch iterations will be taken to optimize the R-D loss in this weight update process, e.g., until reaching a maximum iteration number or until the loss converges.

After that, in the second step, a micro-structured weight pruning process is conducted. In this process, using the weight coefficients $$\{\tilde{W}_j^e(\lambda_i)\} \text{ and } \left\{\tilde{W}_j^d(\lambda_i)\right\}$$

as inputs, in the pruning process, for the unfixed weight coefficients in $$\{\tilde{W}_j^e(\lambda_i)\} \text{ and } \left\{\tilde{W}_j^d(\lambda_i)\right\}$$

(e.g., with corresponding 0 entries in masks $$\{M_{ij}^e\} \text{ and } \{M_{ij}^d\})$$

the pruning component 420 computes a pruning loss $L_s(B_p)$ (e.g., the $L_1$ or $L_2$ norm of the weights in the block) for each micro-structured pruning block $B_p$ (3D block for 3D reshaped weight tensor or 2D block for 2D reshaped weight matrix), as mentioned before. The pruning component 420 ranks these micro-structured blocks in ascending order and prunes the ranked micro-structured blocks (i.e., by setting the corresponding weights in the pruned blocks as 0) top down from the ranked list until a stop criterion is reached. For example, given a validation dataset $S_{val}$, the NIC model with weights $$\{\tilde{W}_j^e(\lambda_i)\}, \left\{\tilde{W}_j^d(\lambda_i)\right\}$$

and masks $$\{M_{ij}^e\}, \{M_{ij}^d\}$$

generates a distortion loss $$D_{val}\left(\{\tilde{W}_j^e(\lambda_i)\}, \left\{\tilde{W}_j^d(\lambda_i)\right\} \{M_{ij}^e\}, \{M_{ij}^d\}\right).$$

As more and more micro-blocks are pruned, this distortion loss will gradually increase. The stop criterion can be a tolerable percentage threshold that allows the distortion loss to increase. The stop criterion can also be a simple preset percentage of the micro-structure pruning blocks to be pruned (e.g., 80% of the top ranked pruning blocks will be pruned). The pruning component 420 generates a set of binary pruning masks $$\{P_{ij}^e\} \text{ and } \{P_{ij}^d\},$$

where an entry in a mask $$P_{ij}^{e} \text{ or } P_{ij}^{d}$$

is 0 means the corresponding weight in $$W_{j}^{e} \text{ or } W_{j}^{d}$$

is pruned.

Then, the weight updating component 430 fixes the additional unfixed weights in $$\left\{\tilde{W}_{j}^{e}(\lambda_i)\right\} \text{ and } \left\{\tilde{W}_{j}^{d}(\lambda_i)\right\}$$

that are masked by $$\left\{P_{ij}^{e}\right\} \text{ and } \left\{P_{ij}^{d}\right\}$$

as being pruned, and updates the remaining weights in $$\left\{\tilde{W}_{j}^{e}(\lambda_i)\right\} \text{ and } \left\{\tilde{W}_{j}^{d}(\lambda_i)\right\}$$

(that are not masked as fixed by $$\left\{M_{ij}^{e}\right\} \text{ and } \left\{M_{ij}^{d}\right\}$$

or masked as pruned by $$\left\{P_{ij}^{e}\right\} \text{ and } \left\{P_{ij}^{d}\right\})$$

by back-propagation to optimize the overall R-D loss of Equation (1) targeting the hyperparameter $\lambda_{i-1}$. Multiple epoch iterations will be taken to optimize the R-D loss in this weight ppdate process, e.g., until reaching a maximum iteration number or until the loss converges. This micro-structured weight pruning process will output the updated weights $$\left\{\hat{W}_{j}^{e}(\lambda_i)\right\} \text{ and } \left\{\hat{W}_{j}^{d}(\lambda_i)\right\}.$$

Then, in the third step, a micro-structured weight unification process is conducted to generate micro-structurally unified weights $$\left\{W_{j}^{e}(\lambda_{i-1})\right\} \text{ and } \left\{W_{j}^{d}(\lambda_{i-}1)\right\}.$$

In this process, using the updated weights $$\left\{\hat{W}_{j}^{e}(\lambda_i)\right\} \text{ and } \left\{\hat{W}_{j}^{d}(\lambda_i)\right\}$$

as inputs, for the unfixed weight coefficients in $$\left\{\hat{W}_{j}^{e}(\lambda_i)\right\} \text{ and } \left\{\hat{W}_{j}^{d}(\lambda_i)\right\}$$

that are not masked by either $$\left\{P_{ij}^{e}\right\}, \left\{P_{ij}^{d}\right\} \text{ or } \left\{M_{ij}^{e}\right\}, \left\{M_{ij}^{d}\right\},$$

the unifying component 440 first computes the unification loss $L_s(B_u)$ for each micro-structured unification block $B_u$ (3D block for 3D reshaped weight tensor or 2D block for 2D reshaped weight matrix) as mentioned before. Then, the unifying component 440 ranks these micro-structured unification blocks in ascending order according to their unification loss, and unifies the blocks top down from the ranked list until a stop criterion is reached. The stop criterion can be a tolerable percentage threshold that allows the distortion loss to increase. Alternatively, the stop criterion can also be a preset percentage of the micro-structure unification blocks to be unify (e.g., 50% of the top ranked blocks will be unified). The unifying component 440 generates a set of binary unification masks $$\left\{U_{ij}^{e}\right\} \text{ and } \left\{U_{ij}^{d}\right\},$$

where an entry in a mask $$U_{ij}^{e} \text{ or } U_{ij}^{d}$$

being 0 means the corresponding weight is unified.

Then, the weight updating component 450 fixes these additional unfixed weights in $$\left\{\hat{W}_{j}^{e}(\lambda_i)\right\} \text{ and } \left\{\hat{W}_{j}^{d}(\lambda_i)\right\}$$

that are masked by $$U_{ij}^{e} \text{ or } U_{ij}^{d}$$

as unified, and updates the remaining weights in $$\left\{\hat{W}_{j}^{e}(\lambda_i)\right\} \text{ and } \left\{\hat{W}_{j}^{d}(\lambda_i)\right\}$$

(that are not masked as fixed by $$\left\{M_{ij}^{e}\right\} \text{ and } \left\{M_{ij}^{d}\right\},$$

or masked as pruned by $$\{P^e_{ij}\} \text{ and } \{P^d_{ij}\},$$

or masked as unified by $$\{U^e_{ij}\} \text{ and } \{U^d_{ij}\}),$$

by back-propagation in the weight update process to optimize the overall R-D loss of Equation (1) targeting the hyperparameter $\lambda_{i-1}$. Multiple epoch iterations will be taken to optimize the R-D loss in this weight update process, e.g., until reaching a maximum iteration number or until the loss converges. This micro-structured weight unification process will output the updated unified weights $$\{W^e_j(\lambda_{i-1})\} \text{ and } \{W^d_j(\lambda_i - 1)\}.$$

Finally, the weight updating component 450 computes the corresponding masks $$\{M^e_{i-1j}\} \text{ and } \{M^d_{i-1j}\}$$

as:

$$M^e_{i-1j} = M^e_{ij} \cup P^e_{ij} \text{ and } M^d_{i-1j} = M^d_{ij} \cup P^d_{ij}.$$

That is, the non-pruned entries in $$P^e_{ij}(P^d_{ij})$$

that are non-fixed in $$M^e_{ij}(M^d_{ij})$$

will be additionally set to 1 as being masked in $$M^e_{i-1j}(^d_{i-1j}).$$

The above multi-step processing cycle goes on until the hyperparameter $\lambda_1$ is reached. Note that for the last training cycle, the second micro-structured weight pruning step can be omitted, in which better NIC performance with a less compact model may be obtained. The final updated weights $$\{W^e_j(\lambda_1)\} \text{ and } \{W^d_j(\lambda_1)\}$$

are the final output weights $$\{W^e_j\} \text{ and } \{W^d_j\}$$

for the learned model instance.

Figure 4B:
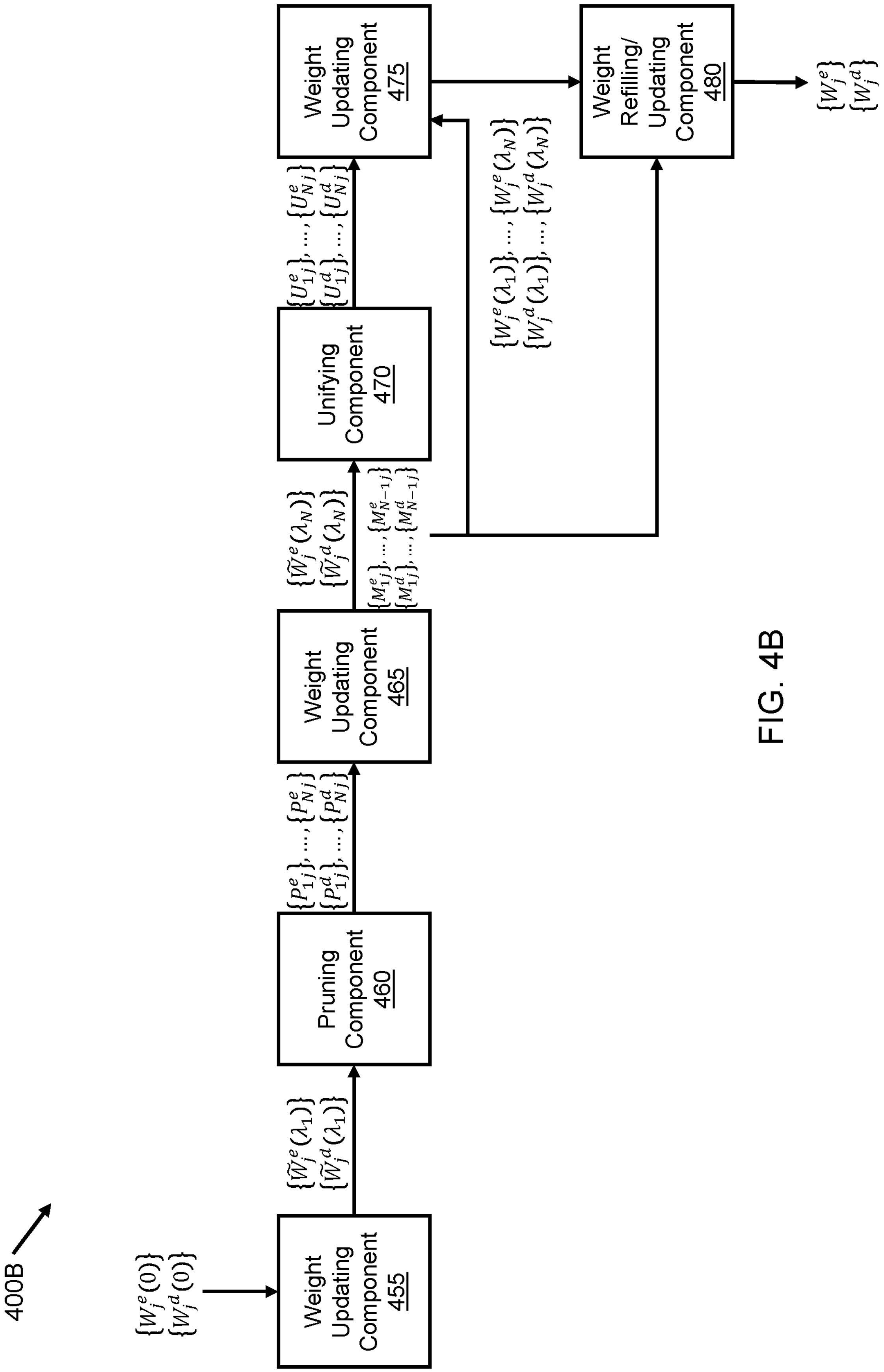
FIG. 4B is a block diagram of a training apparatus for multi-rate neural image compression by micro-structured nested masks and weight unification, during a training stage, according to other embodiments.

FIG. 4B is a block diagram of a training apparatus 400B for multi-rate neural image compression by micro-structured nested masks and weight unification, during a training stage, according to other embodiments.

As shown in FIG. 4B, the training apparatus 400B includes a weight updating component 455, a pruning component 460, a weight updating component 465, a unifying component 470, a weight updating component 475 and a weight refilling/updating component 480.

FIG. 4B describes an overall workflow of another proposed multi-stage training framework. Given a set of initial weights $$\{W^e_j(0)\} \text{ and } \{W^d_j(0)\}$$

(e.g., randomly initialized according to some distributions), the weight updating component 455 learns a set of model weights $$\{\tilde{W}^e_j(\lambda_1)\}, \{\tilde{W}^d_j(\lambda_1)\}$$

through a weight update process using regular back-propagation using a training dataset $S_{tr}$ by optimizing the R-D loss of Equation (1) targeting a hyperparameter $\lambda_1$ (corresponding to the minimum distortion).

After that, a micro-structured pruning process is conducted based on the model weights $$\{\tilde{W}^e_j(\lambda_1)\}, \{\tilde{W}^d_j(\lambda_1)\}.$$

In this micro-structured pruning process, the pruning component 460 partitions each reshaped 3D weight tensor or 2D weight matrix into micro-blocks (3D block for 3D reshaped weight tensor or 2D block for 2D reshaped weight matrix) as mentioned before, and computes a pruning loss $L_s(B_p)$ (e.g., the $L_1$ or $L_2$ norm of the weights in the block) for each micro-structured block $B_p$. The pruning component 460 ranks these micro-structured blocks in ascending order and prunes the micro-structured blocks (i.e., by setting the corresponding weights in the pruned blocks as 0) from top to down on the ranked list to target each of the hyperparameters X.N in the following way. Assume the current weights are $$\{\tilde{W}^e_j(\lambda_i)\},$$

$$\{\tilde{W}^d_j(\lambda_i)\},$$

and the corresponding binary pruning masks are $$\{P^e_{ij}\} \text{ and } \{P^d_{ij}\},$$

where an entry in a mask $$P^e_{ij} \text{ or } P^d_{ij}$$

being 0 means the corresponding weight in $$\tilde{W}^e_j(\lambda_i) \text{ or } \tilde{W}^d_j(\lambda_i)$$

is pruned. Now the target is to obtain the pruning masks $$\{P^e_{i+1j}\} \text{ and } \{P^d_{i+1j}\}$$

for a hyperparameter $\lambda_{i+1}$, and obtain updated weights $$\{\tilde{W}^e_j(\lambda_{i+1})\}, \{\tilde{W}^d_j(\lambda_{i+1})\}.$$

To achieve this goal, in the pruning process, the pruning component 460 fixes the weight coefficients in $$\tilde{W}^e_j(\lambda_i) \text{ or } \tilde{W}^d_j(\lambda_i)$$

that are masked to be pruned by $$\{P^e_{ij}\} \text{ and } \{P^d_{ij}\},$$

and prunes the remaining unpruned micro-blocks down the ranked linked until reaching a stop criterion for the hyperparameter $\lambda_{i+1}$. For example, given a validation dataset $S_{val}$, the NIC model with weights $$\{\tilde{W}^e_j(\lambda_i)\}, \{\tilde{W}^d_j(\lambda_i)\}$$

generates a distortion loss $$D_{val}(\{\tilde{W}^e_j(\lambda_i)\}, \{\tilde{W}^d_j(\lambda_i)\}).$$

As more and more micro-blocks are pruned, this distortion loss will gradually increase. The stop criterion can be a tolerable percentage threshold that allows the distortion loss to increase. Alternatively, the stop criterion can simply be a preset percentage of pruning blocks to be pruned each time (e.g., 50% of the top ranked blocks will be pruned for the hyperparameter $\lambda_{i+1}$, and 50% of the remaining non-pruned top ranked blocks will be pruned for a next hyperparameter $\lambda_{i+2}$, and so on). Then, the pruning component 460 generates pruning masks $$\{P^e_{i+1j}\} \text{ and } \{P^d_{i+1j}\}$$

by adding these additional pruned micro-blocks into $$\{P^e_{ij}\} \text{ and } \{P^d_{ij}\}.$$

Then in the weight update process, the weight updating component 465 fixes all these pruned micro-blocks masked by $$\{P^e_{i+1j}\} \text{ and } \{P^d_{i+1j}\},$$

and updates the remaining unfixed weights using regular back-propagation to optimize the R-D loss of Equation (1) targeting at the hyperparameter $\lambda_{i+1}$. This results in the set of updated weights $$\{\tilde{W}^e_j(\lambda_{i+1})\}, \{\tilde{W}^d_j(\lambda_{i+1})\}.$$

By repeating the above pruning and weight update processes for each of the hyperparameters $\lambda_1, \ldots, \lambda_N$, the pruning component 460 obtains the set of pruning masks $$\{P^e_{1j}\}, \ldots, \{P^e_{Nj}\}, \{P^d_{1j}\}, \ldots, \{P^d_{Nj}\},$$

and the weight updating component 465 obtains the final updated weights $$\{\tilde{W}^e_j(\lambda_N)\}, \{\tilde{W}^d_j(\lambda_N)\}.$$

In the embodiments, the pruning masks $$\{P^e_{ij}\} \text{ and } \{P^d_{ij}\}$$

are directly used as the model masks $$\{M^e_{ij}\} \text{ and } \{M^d_{ij}\}$$

for a hyperparameter $\lambda_i$.

After that, the weights $$\{W^e_j\} \text{ and } \{W^d_j\}$$

based on the update weights $$\{\tilde{W}^e_j(\lambda_N)\},$$

$$\{\tilde{W}_j^d(\lambda_N)\}$$

and masks $$\{M_{1j}^e\}, \ldots, \{M_{ij}^e\} \text{ and } \{M_{1j}^d\}, \ldots, \{M_{ij}^d\}$$

are trained by alternating the following two steps.

In step 1, given the current weights $$\{\tilde{W}_j^e(\lambda_i)\}, \{\tilde{W}_j^d(\lambda_i)\},$$

the unifying component 470 fixes the weight coefficients in $$\{\tilde{W}_j^e(\lambda_i)\}, \{\tilde{W}_j^d(\lambda_i)\}$$

that are masked as 0 in $$\{M_{ij}^e\} \text{ and } \{M_{ij}^d\}$$

(i.e., will not be used for inference for the current hyperparameter $\lambda_i$), and fixes the weight coefficients in $$\{\tilde{W}_j^e(\lambda_i)\}, \{\tilde{W}_j^d(\lambda_i)\}$$

that are masked as 1 in $$\{M_{i+1j}^e\}, \{M_{i+1j}^d\}$$

(i.e., will be used for inference for the previous hyperparameter $\lambda_{i+1}$). Note that masks $$\{M_{N+1j}^e\} \text{ and } \{M_{N+1j}^d\}$$

have all zero entries. Then, a micro-structured weight unification process is conducted to generate micro-structurally unified weights $$\{W_j^e(\lambda_i)\} \text{ and } \{W_j^d(\lambda_i)\}.$$

In this process, the unifying component 470 first computes the unification loss $L_s(B_u)$ for each micro-structured unification block $B_u$ of the unfixed weight coefficients (3D block for 3D reshaped weight tensor or 2D block for 2D reshaped weight matrix) as mentioned before. Then the unifying component 470 ranks these micro-structured unification blocks in ascending order according to their unification loss, and unifies the blocks top down from the ranked list until a stop criterion is reached. The stop criterion can be a tolerable percentage threshold that allows the distortion loss to increase. Alternatively, the stop criterion can also be a preset percentage of the micro-structure unification blocks to be unified (e.g., 50% of the top ranked blocks will be unified). The unifying component 470 generates a set of binary unification masks $$\{U_{ij}^e\} \text{ and } \{U_{ij}^d\},$$

where an entry in a mask $$U_{ij}^e$$

or $$U_{ij}^d$$

being 0 means the corresponding weight is unified.

Then, the weight updating component 475 fixes these additional unfixed weights in $$\{\tilde{W}_j^e(\lambda_i)\} \text{ and } \{\tilde{W}_j^d(\lambda_i)\}$$

that are masked by $$U_{ij}^e \text{ or } U_{ij}^d$$

as unified, and updates the remaining weights that are not masked as fixed by $$\{M_{ij}^e\} \text{ and } \{M_{ij}^d\}$$

or masked as fixed by $$\{M_{i+1j}^e\}$$

and $$\{M_{i+1j}^d\},$$

or masked as unified by $$\{U_{ij}^e\} \text{ and } \{U_{ij}^d\},$$

by back-propagation in the weight update process to optimize the overall R-D loss of Equation (1) targeting at the hyperparameter $\lambda_i$. Multiple epoch iterations will be taken to optimize the R-D loss in this weight update process, e.g., until reaching a maximum iteration number or until the loss converges. This micro-structured weight unification process will output the updated unified weights $$\{W_j^e(\lambda_i)\}$$

and $$\{W_j^d(\lambda_i)\}.$$

In step 2, next, in the weight refill and update process, the weight refilling/updating component 480 fixes the weight coefficients in $$\{W_j^e(\lambda_i)\} \text{ and } \{W_j^d(\lambda_i)\}$$

that are masked as 1 in $$\{M_{ij}^e\} \text{ and } \{M_{ij}^d\},$$

and fills in weight coefficients that are masked as 1 in $$\{M_{i-1j}^e\} \text{ and } \{M_{i-1j}^d\}$$

but 0 in $$\{M_{ij}^e\} \text{ and } \{M_{ij}^d\}.$$

These weights can be filled with their original values at the time they are pruned in the pruning process, or they can be filled with randomly initialized values. Then, the weight refilling/updating component 480 updates these newly filled weights with regular back-propagation by optimizing the R-D loss of Equation (1) targeting at the hyperparameter $\lambda_{i-1}$. This results in the updated weights $$\{\tilde{W}_j^e(\lambda_{i-1})\}, \{\tilde{W}_j^d(\lambda_{i-1})\}.$$

This two-step process is repeated until the last weights $$\{W_j^e(\lambda_1)\}, \{W_j^d(\lambda_1)\}$$

are obtained. Weights $$\{W_j^e(\lambda_1)\}, \{W_j^d(\lambda_1)\}$$

are the final output weights $$\{W_j^e\} \text{ and } \{W_j^d\}.$$

Figure 5:
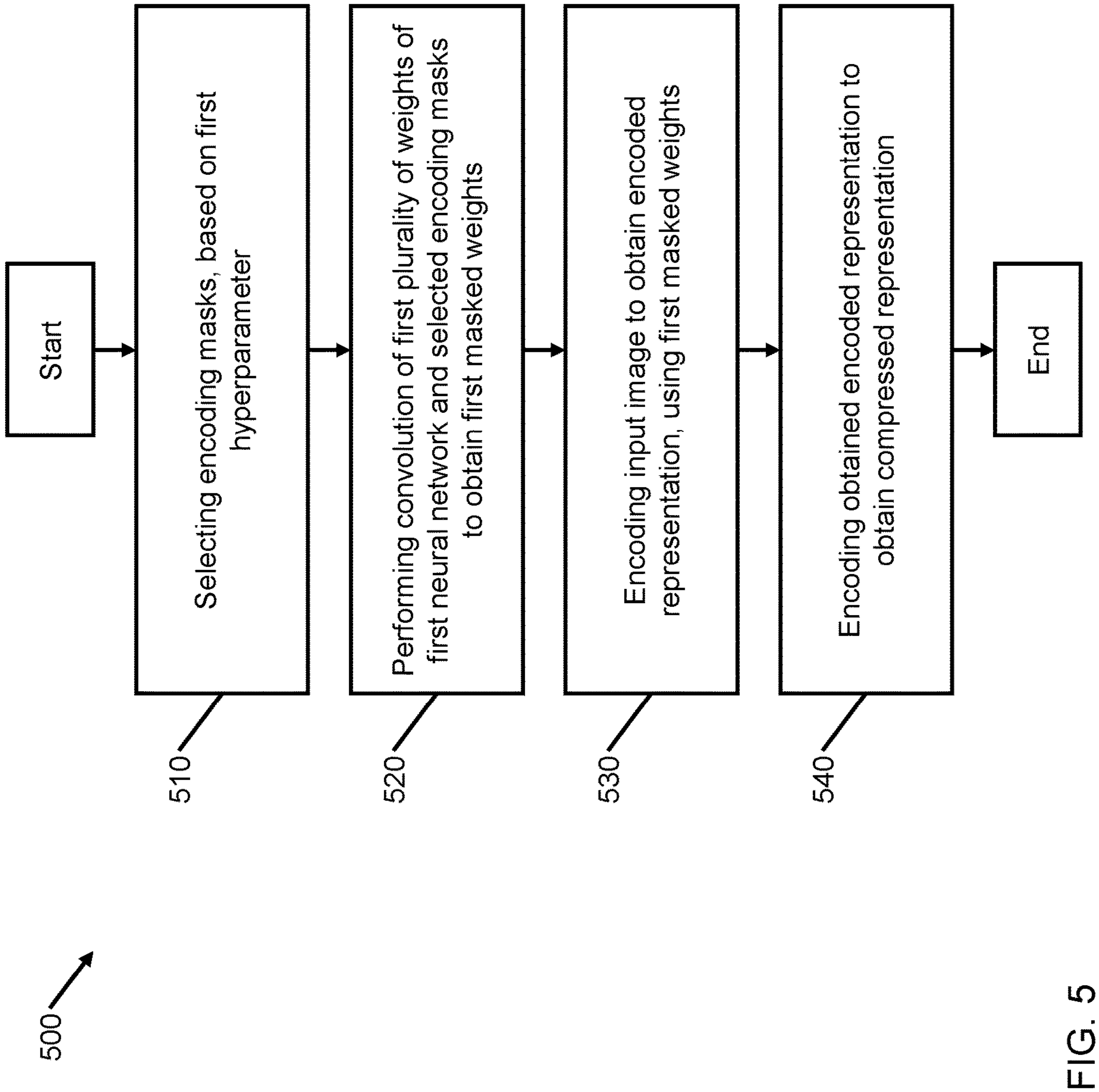
FIG. 5 is a flowchart of a method of multi-rate neural image compression by micro-structured nested masks and weight unification, according to embodiments.

FIG. 5 is a flowchart of a method 500 of multi-rate neural image compression by micro-structured nested masks and weight unification, according to embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes selecting encoding masks, based on a first hyperparameter.

In operation 520, the method 500 includes performing a convolution of a first plurality of weights of a first neural network and the selected encoding masks to obtain first masked weights.

In operation 530, the method 500 includes encoding an input image to obtain an encoded representation, using the first masked weights.

In operation 540, the method 500 includes encoding the obtained encoded representation to obtain a compressed representation.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 6:
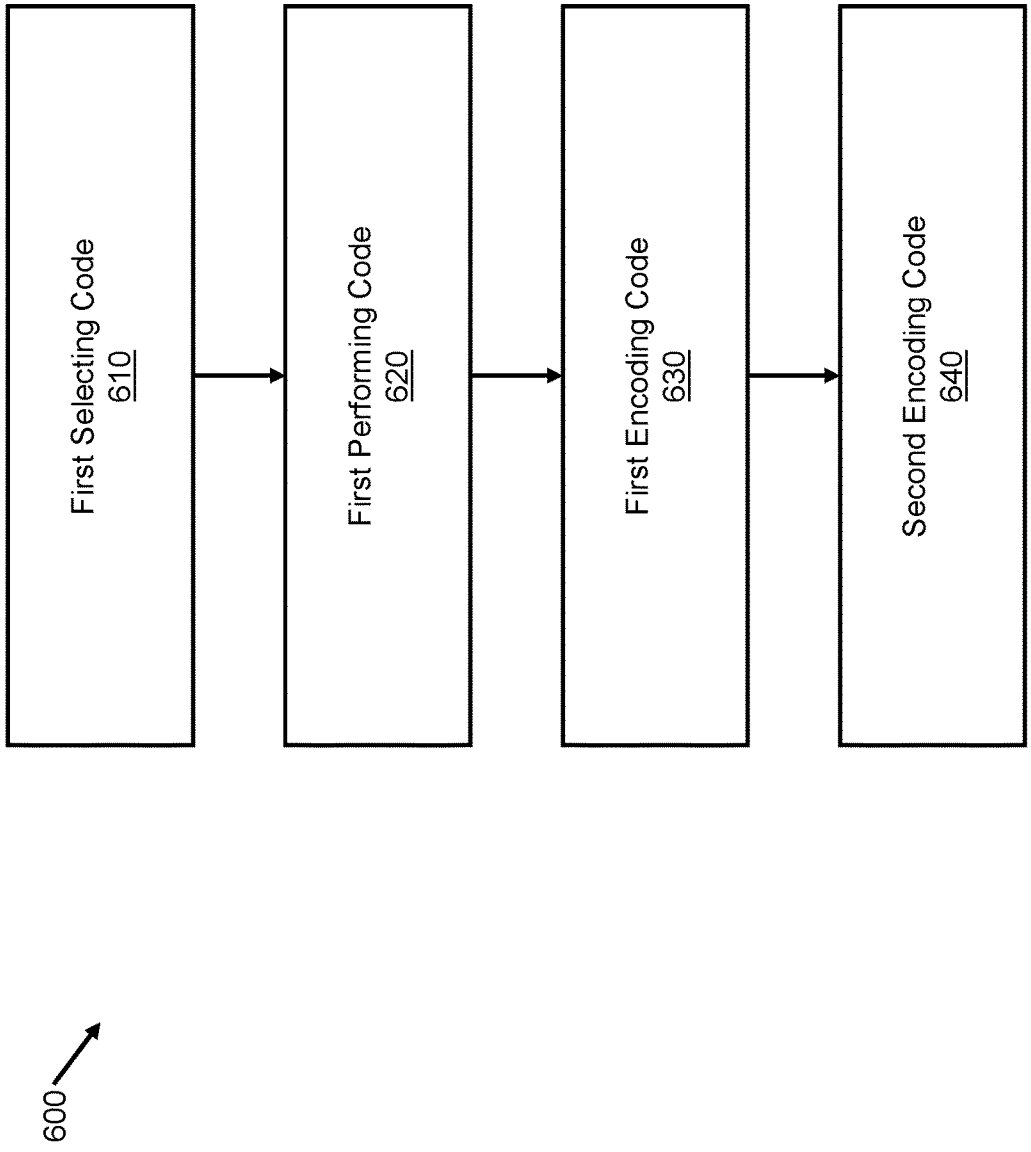
FIG. 6 is a block diagram of an apparatus for multi-rate neural image compression by micro-structured nested masks and weight unification, according to embodiments.

FIG. 6 is a block diagram of an apparatus 600 for multi-rate neural image compression by micro-structured nested masks and weight unification, according to embodiments.

As shown in FIG. 6, the apparatus 600 includes first selecting code 610, first performing code 620, first encoding code 630, second encoding code 640.

The first selecting code 610 is configured to cause at least one processor to select encoding masks, based on a hyperparameter.

The first performing code 620 is configured to cause the at least one processor to perform a convolution of a first plurality of weights of a first neural network and the selected encoding masks to obtain first masked weights.

The first encoding code 630 is configured to cause the at least one processor to encode an input image to obtain an encoded representation, using the first masked weights.

The second encoding code 640 is configured to cause the at least one processor to encode the obtained encoded representation to obtain a compressed representation.

Figure 7:
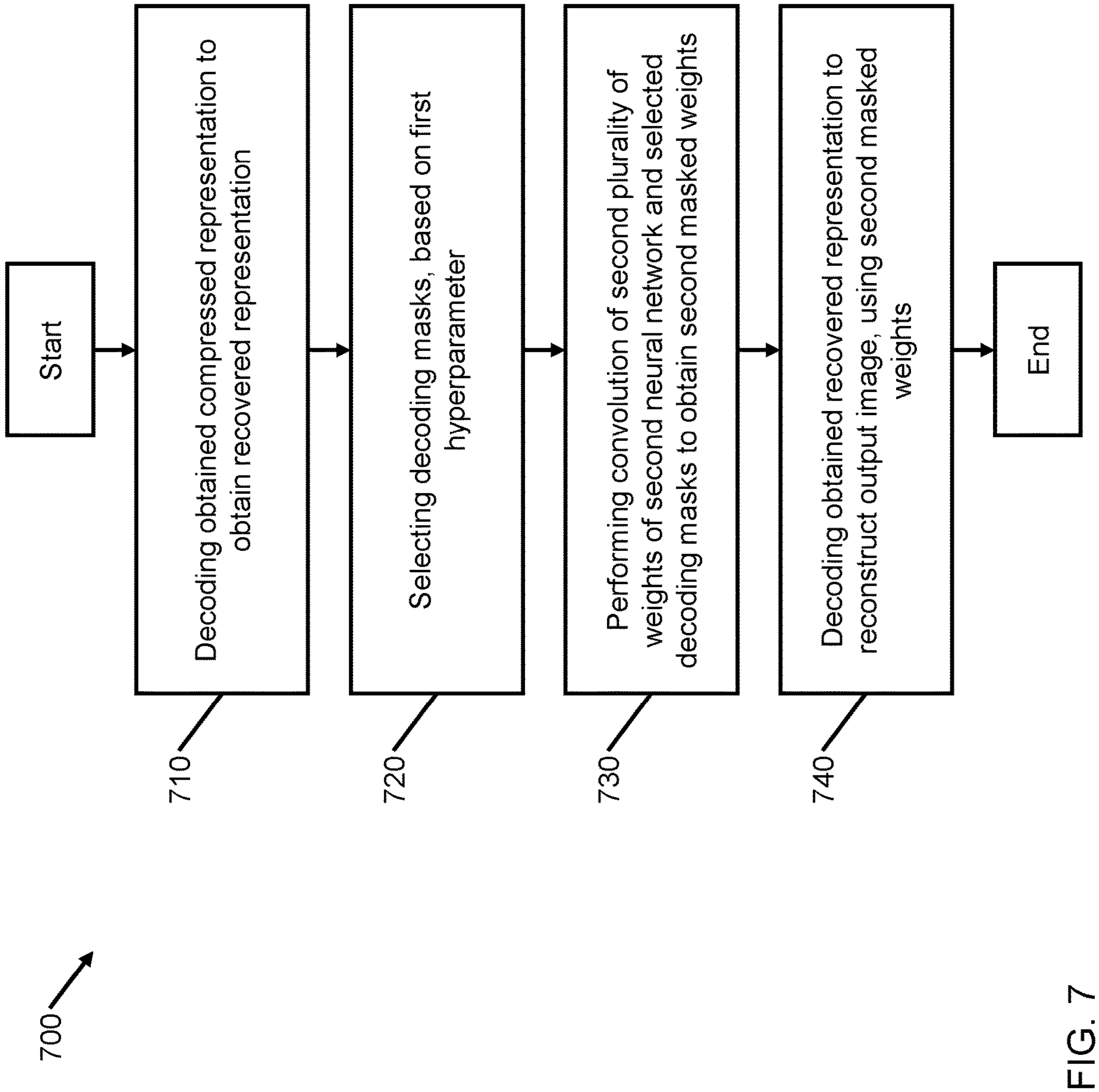
FIG. 7 is a flowchart of a method of multi-rate neural image decompression by micro-structured nested masks and weight unification, according to embodiments.

FIG. 7 is a flowchart of a method 700 of multi-rate neural image decompression by micro-structured nested masks and weight unification, according to embodiments.

In some implementations, one or more process blocks of FIG. 7 may be performed by the platform 120. In some implementations, one or more process blocks of FIG. 7 may be performed by another device or a group of devices separate from or including the platform 120, such as the user device 110.

As shown in FIG. 7, in operation 710, the method 700 includes decoding the obtained compressed representation to obtain a recovered representation.

In operation 720, the method 700 includes selecting decoding masks, based on the first hyperparameter.

In operation 730, the method 700 includes performing a convolution of a second plurality of weights of a second neural network and the selected decoding masks to obtain second masked weights.

In operation 740, the method 700 includes decoding the obtained recovered representation to reconstruct an output image, using the second masked weights.

The first neural network and the second neural network may be trained by updating one or more of the first plurality of weights and the second plurality of weights that are not respectively masked by the encoding masks and the decoding masks, to minimize a rate-distortion loss that is determined based on the input image, the output image and the compressed representation.

The first neural network and the second neural network may be further trained by pruning the updated one or more of the first plurality of weights and the second plurality of weights not respectively masked by the encoding masks and the decoding masks, to obtain binary pruning masks indicating which of the first plurality of weights and the second plurality of weights are pruned, and updating at least one of the first plurality of weights and the second plurality of weights that are not respectively masked by the encoding masks, the decoding masks and the obtained binary pruning masks, to minimize the rate-distortion loss.

The first neural network and the second neural network may be further trained by unifying the updated at least one of the first plurality of weights and the second plurality of weights not respectively masked by the encoding masks, the decoding masks, and the obtained binary pruning masks, to obtain binary unification masks indicating which of the first plurality of weights and the second plurality of weights are unified, and updating a portion of the first plurality of weights and the second plurality of weights that are not respectively masked by the encoding masks, the decoding masks, the obtained binary pruning masks and the obtained binary unification masks, to minimize the rate-distortion loss.

The first neural network and the second neural network may be further trained by repeating, for each of a plurality of hyperparameters, the pruning the updated one or more of the first plurality of weights and the second plurality of weights, the updating the at least one of the first plurality of weights and the second plurality of weights, the unifying the updated at least one of the first plurality of weights and the second plurality of weights, and the updating the portion of the first plurality of weights and the second plurality of weights.

The first neural network and the second neural network may be further trained by fixing a first set of the updated portion of first plurality of weights and the second plurality of weights that are masked as 1 in the encoding masks and the decoding masks, filling in a second set of the updated portion of the first plurality of weights and the second plurality of weights that are masked as 0 in the encoding masks and the decoding masks, and updating the filled in second set of the first plurality of weights and the second plurality of weights, to minimize the rate-distortion loss.

Although FIG. 7 shows example blocks of the method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel.

Figure 8:
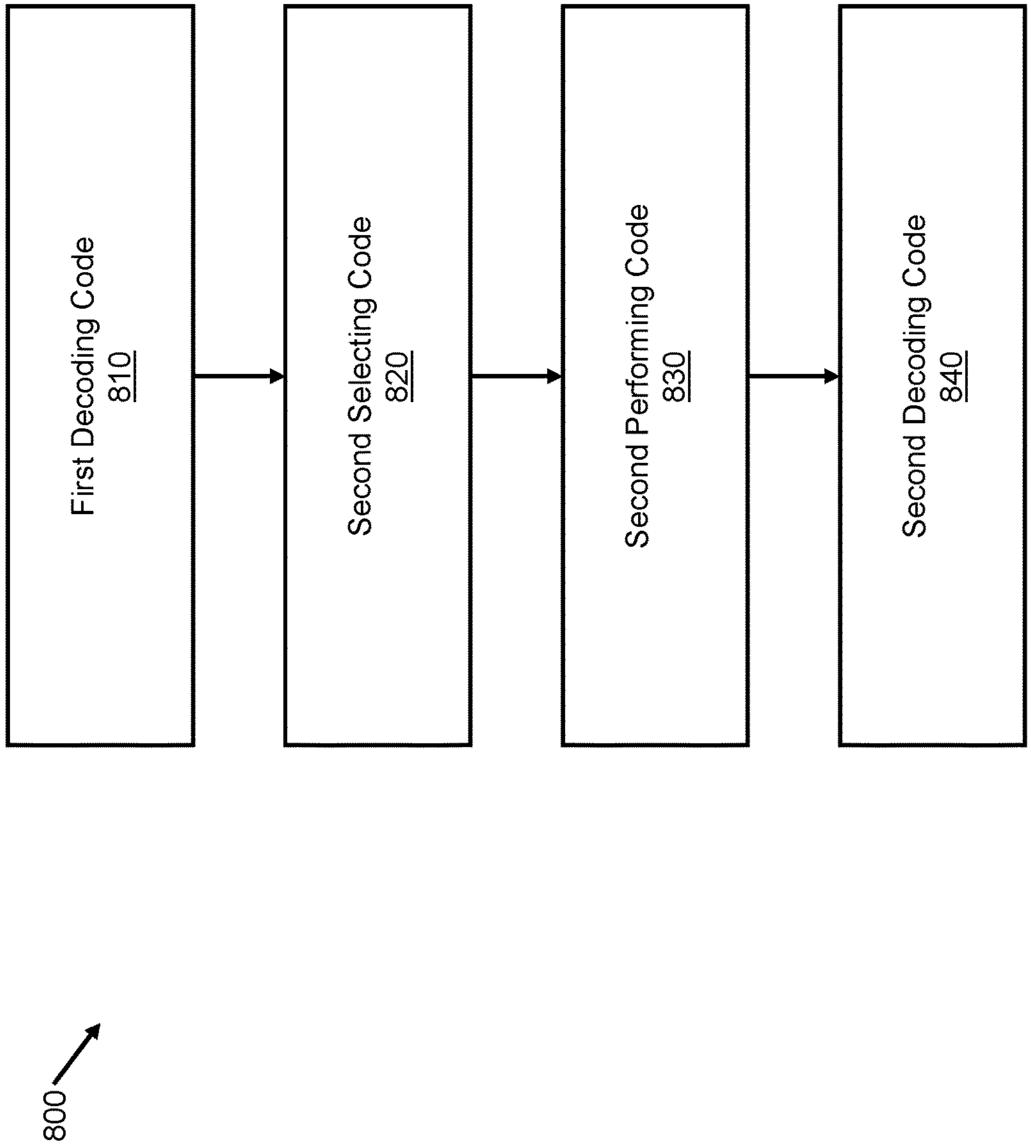
FIG. 8 is a block diagram of an apparatus for multi-rate neural image decompression by micro-structured nested masks and weight unification, according to embodiments.

FIG. 8 is a block diagram of an apparatus 800 for multi-rate neural image decompression by micro-structured nested masks and weight unification, according to embodiments.

As shown in FIG. 8, the apparatus 800 includes first decoding code 810, second selecting code 820, second performing code 830 and second decoding code 840.

The first decoding code 810 configured to cause the at least one processor to decode the obtained compressed representation to obtain a recovered representation;

The second selecting code 820 configured to cause the at least one processor to select decoding masks, based on the hyperparameter;

The second performing code 830 configured to cause the at least one processor to perform a convolution of a second plurality of weights of a second neural network and the selected decoding masks to obtain second masked weights; and The second decoding code 840 configured to cause the at least one processor to decode the obtained recovered representation to reconstruct an output image, using the second masked weights.

The first neural network and the second neural network may be trained by updating one or more of the first plurality of weights and the second plurality of weights that are not respectively masked by the encoding masks and the decoding masks, to minimize a rate-distortion loss that is determined based on the input image, the output image and the compressed representation.

The first neural network and the second neural network may be further trained by pruning the updated one or more of the first plurality of weights and the second plurality of weights not respectively masked by the encoding masks and the decoding masks, to obtain binary pruning masks indicating which of the first plurality of weights and the second plurality of weights are pruned, and updating at least one of the first plurality of weights and the second plurality of weights that are not respectively masked by the encoding masks, the decoding masks and the obtained binary pruning masks, to minimize the rate-distortion loss.

The first neural network and the second neural network may be further trained by unifying the updated at least one of the first plurality of weights and the second plurality of weights not respectively masked by the encoding masks, the decoding masks, and the obtained binary pruning masks, to obtain binary unification masks indicating which of the first plurality of weights and the second plurality of weights are unified, and updating a portion of the first plurality of weights and the second plurality of weights that are not respectively masked by the encoding masks, the decoding masks, the obtained binary pruning masks and the obtained binary unification masks, to minimize the rate-distortion loss.

The first neural network and the second neural network may be further trained by repeating, for each of a plurality of hyperparameters, the pruning the updated one or more of the first plurality of weights and the second plurality of weights, the updating the at least one of the first plurality of weights and the second plurality of weights, the unifying the updated at least one of the first plurality of weights and the second plurality of weights, and the updating the portion of the first plurality of weights and the second plurality of weights.

The first neural network and the second neural network may be further trained by fixing a first set of the updated portion of first plurality of weights and the second plurality of weights that are masked as 1 in the encoding masks and the decoding masks, filling in a second set of the updated portion of the first plurality of weights and the second plurality of weights that are masked as 0 in the encoding masks and the decoding masks, and updating the filled in second set of the first plurality of weights and the second plurality of weights, to minimize the rate-distortion loss.

Comparing with the previous E2E image compression methods, the embodiments include largely reduced deployment storage to achieve multi-rate compression and largely reduced inference time, and flexible and general framework that accommodates various types of NIC models. The embodiments are further flexible to accommodate any desired micro-structures for both multi-rate masking and micro-structured unification.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of multi-rate neural image compression, the method being performed by at least one processor, and the method comprising:

selecting encoding masks, based on a first hyperparameter;

performing, for each of a plurality of first layers, a convolution of a first plurality of weights of a first neural network and the selected encoding masks to obtain first masked weights, the pruning comprising obtaining a block-wise micro-structure with respect to the first plurality of weights and the selected encoding masks such that respective blocks in the first plurality of weights and the selected encoding masks are block-wise pruned and block-wise unified, wherein each respective encoding mask from the selected encoding masks is associated with a respective first plurality of weights, and wherein the block-wise micro-structure is a first micro-structure for block-wise pruning of the first plurality of weights and the selected encoding masks, and a second structure micro-structure different from the first micro-structure for block-wise unifying of the first plurality of weights and the selected encoding masks;

encoding an input image to obtain an encoded representation, using the first masked weights; and encoding the obtained encoded representation to obtain a compressed representation.

2. The method of claim 1, further comprising:

decoding the obtained compressed representation to obtain a recovered representation;

selecting decoding masks, based on the first hyperparameter;

performing, for each of a plurality of second layers a convolution of a second plurality of weights of a second neural network and the selected decoding masks to obtain second masked weights, wherein the second plurality of weights and the selected decoding masks have a block-wise micro-structure such that respective blocks in the second plurality of weights and the selected decoding masks are block-wise pruned and block-wise unified; and decoding the obtained recovered representation to reconstruct an output image, using the second masked weights.

3. The method of claim 2, wherein the first neural network and the second neural network are trained by updating one or more of the first plurality of weights and the second plurality of weights that are not respectively masked by the encoding masks and the decoding masks, to minimize a rate-distortion loss that is determined based on the input image, the output image and the compressed representation.

4. The method of claim 3, wherein the first neural network and the second neural network are further trained by:

pruning the updated one or more of the first plurality of weights and the second plurality of weights not respectively masked by the encoding masks and the decoding masks, to obtain binary pruning masks indicating which of the first plurality of weights and the second plurality of weights are pruned; and updating at least one of the first plurality of weights and the second plurality of weights that are not respectively masked by the encoding masks, the decoding masks and the obtained binary pruning masks, to minimize the rate-distortion loss.

5. The method of claim 4, wherein the first neural network and the second neural network are further trained by:

unifying the updated at least one of the first plurality of weights and the second plurality of weights not respectively masked by the encoding masks, the decoding masks, and the obtained binary pruning masks, to obtain binary unification masks indicating which of the first plurality of weights and the second plurality of weights are unified; and updating a portion of the first plurality of weights and the second plurality of weights that are not respectively masked by the encoding masks, the decoding masks, the obtained binary pruning masks and the obtained binary unification masks, to minimize the rate-distortion loss.

6. The method of claim 5, wherein the first neural network and the second neural network are further trained by repeating, for each of a plurality of hyperparameters, the pruning the updated one or more of the first plurality of weights and the second plurality of weights, the updating the at least one of the first plurality of weights and the second plurality of weights, the unifying the updated at least one of the first plurality of weights and the second plurality of weights, and the updating the portion of the first plurality of weights and the second plurality of weights.

7. The method of claim 5, wherein the first neural network and the second neural network are further trained by:

fixing a first set of an updated portion of first plurality of weights and the second plurality of weights that are masked as 1 in the encoding masks and the decoding masks;

filling in a second set of the updated portion of the first plurality of weights and the second plurality of weights that are masked as 0 in the encoding masks and the decoding masks; and updating the filled in second set of the first plurality of weights and the second plurality of weights, to minimize the rate-distortion loss.

8. An apparatus for multi-rate neural image compression, the apparatus comprising:

at least one memory configured to store program code; and at least one processor configured to read the program code and operate as instructed by the program code, the program code comprising:

first selecting code configured to cause the at least one processor to select encoding masks, based on a hyperparameter;

first performing code configured to cause the at least one processor to perform, for each of a plurality of first layers, a convolution of a first plurality of weights of a first neural network and the selected encoding masks to obtain first masked weights, the pruning comprising obtaining a block-wise micro-structure with respect to the first plurality of weights and the selected encoding masks such that respective blocks in the first plurality of weights and the selected encoding masks are block-wise pruned and block-wise unified, wherein each respective encoding mask from the selected encoding masks is associated with a respective first plurality of weights, and wherein the block-wise micro-structure is a first micro-structure for block-wise pruning of the first plurality of weights and the selected encoding masks, and a second structure micro-structure different from the first micro-structure for block-wise unifying of the first plurality of weights and the selected encoding masks;

first encoding code configured to cause the at least one processor to encode an input image to obtain an encoded representation, using the first masked weights; and second encoding code configured to cause the at least one processor to encode the obtained encoded representation to obtain a compressed representation.

9. The apparatus of claim 8, wherein the program code further comprises:

first decoding code configured to cause the at least one processor to decode the obtained compressed representation to obtain a recovered representation;

second selecting code configured to cause the at least one processor to select decoding masks, based on the hyperparameter;

second performing code configured to cause the at least one processor to perform, for each of a plurality of second layers, a convolution of a second plurality of weights of a second neural network and the selected decoding masks to obtain second masked weights, wherein the second plurality of weights and the selected decoding masks have a block-wise micro-structure such that respective blocks in the second plurality of weights and the selected decoding masks are block-wise pruned and block-wise unified; and second decoding code configured to cause the at least one processor to decode the obtained recovered representation to reconstruct an output image, using the second masked weights.

10. The apparatus of claim 9, wherein the first neural network and the second neural network are trained by updating one or more of the first plurality of weights and the second plurality of weights that are not respectively masked by the encoding masks and the decoding masks, to minimize a rate-distortion loss that is determined based on the input image, the output image and the compressed representation.

11. The apparatus of claim 10, wherein the first neural network and the second neural network are further trained by:

pruning the updated one or more of the first plurality of weights and the second plurality of weights not respectively masked by the encoding masks and the decoding masks, to obtain binary pruning masks indicating which of the first plurality of weights and the second plurality of weights are pruned; and updating at least one of the first plurality of weights and the second plurality of weights that are not respectively masked by the encoding masks, the decoding masks and the obtained binary pruning masks, to minimize the rate-distortion loss.

12. The apparatus of claim 11, wherein the first neural network and the second neural network are further trained by:

unifying the updated at least one of the first plurality of weights and the second plurality of weights not respectively masked by the encoding masks, the decoding masks, and the obtained binary pruning masks, to obtain binary unification masks indicating which of the first plurality of weights and the second plurality of weights are unified; and updating a portion of the first plurality of weights and the second plurality of weights that are not respectively masked by the encoding masks, the decoding masks, the obtained binary pruning masks and the obtained binary unification masks, to minimize the rate-distortion loss.

13. The apparatus of claim 12, wherein the first neural network and the second neural network are further trained by repeating, for each of a plurality of hyperparameters, the pruning the updated one or more of the first plurality of weights and the second plurality of weights, the updating the at least one of the first plurality of weights and the second plurality of weights, the unifying the updated at least one of the first plurality of weights and the second plurality of weights, and the updating the portion of the first plurality of weights and the second plurality of weights.

14. The apparatus of claim 12, wherein the first neural network and the second neural network are further trained by:

fixing a first set of an updated portion of first plurality of weights and the second plurality of weights that are masked as 1 in the encoding masks and the decoding masks;

filling in a second set of the updated portion of the first plurality of weights and the second plurality of weights that are masked as 0 in the encoding masks and the decoding masks; and updating the filled in second set of the first plurality of weights and the second plurality of weights, to minimize the rate-distortion loss.

15. A non-transitory computer-readable medium storing instructions that, when executed by at least one processor for multi-rate neural image compression, cause the at least one processor to:

select encoding masks, based on a hyperparameter;

perform, for each of a plurality of first layers, a convolution of a first plurality of weights of a first neural network and the selected encoding masks to obtain first masked weights, the pruning comprising obtaining a block-wise micro-structure with respect to the first plurality of weights and the selected encoding masks such that respective blocks in the first plurality of weights and the selected encoding masks are block-wise pruned and block-wise unified, wherein each respective encoding mask from the selected encoding masks is associated with a respective first plurality of weights, and wherein the block-wise micro-structure is a first micro-structure for block-wise pruning of the first plurality of weights and the selected encoding masks, and a second structure micro-structure different from the first micro-structure for block-wise unifying of the first plurality of weights and the selected encoding masks;

encode an input image to obtain an encoded representation, using the first masked weights; and encode the obtained encoded representation to obtain a compressed representation.

16. The non-transitory computer-readable medium of claim 15, wherein the instructions, when executed by the at least one processor, further cause the at least one processor to:

decode the obtained compressed representation to obtain a recovered representation;

select decoding masks, based on the hyperparameter;

perform, for each of a plurality of second layers, a convolution of a second plurality of weights of a second neural network and the selected decoding masks to obtain second masked weights, wherein the second plurality of weights and the selected decoding masks have a block-wise micro-structure such that respective blocks in the second plurality of weights and the selected decoding masks are block-wise pruned and block-wise unified; and decode the obtained recovered representation to reconstruct an output image, using the second masked weights.

17. The non-transitory computer-readable medium of claim 16, wherein the first neural network and the second neural network are trained by updating one or more of the first plurality of weights and the second plurality of weights that are not respectively masked by the encoding masks and the decoding masks, to minimize a rate-distortion loss that is determined based on the input image, the output image and the compressed representation.

18. The non-transitory computer-readable medium of claim 17, wherein the first neural network and the second neural network are further trained by:

pruning the updated one or more of the first plurality of weights and the second plurality of weights not respectively masked by the encoding masks and the decoding masks, to obtain binary pruning masks indicating which of the first plurality of weights and the second plurality of weights are pruned; and updating at least one of the first plurality of weights and the second plurality of weights that are not respectively masked by the encoding masks, the decoding masks and the obtained binary pruning masks, to minimize the rate-distortion loss.

19. The non-transitory computer-readable medium of claim 18, wherein the first neural network and the second neural network are further trained by:

unifying the updated at least one of the first plurality of weights and the second plurality of weights not respectively masked by the encoding masks, the decoding masks, and the obtained binary pruning masks, to obtain binary unification masks indicating which of the first plurality of weights and the second plurality of weights are unified; and updating a portion of the first plurality of weights and the second plurality of weights that are not respectively masked by the encoding masks, the decoding masks, the obtained binary pruning masks and the obtained binary unification masks, to minimize the rate-distortion loss.

20. The non-transitory computer-readable medium of claim 19, wherein the first neural network and the second neural network are further trained by repeating, for each of a plurality of hyperparameters, the pruning the updated one or more of the first plurality of weights and the second plurality of weights, the updating the at least one of the first plurality of weights and the second plurality of weights, the unifying the updated at least one of the first plurality of weights and the second plurality of weights, and the updating the portion of the first plurality of weights and the second plurality of weights.

* * * * *